(12) United States Patent
Reiker

(10) Patent No.: US 6,730,844 B2
(45) Date of Patent: May 4, 2004

(54) DUAL-PURPOSE WIRING DEVICE AND METHOD OF WIRING

(76) Inventor: Kenneth H Reiker, 269 Country Club Dr., Shalimar, FL (US) 32579

( * ) Notice: Subject to any disclaimer, the term of this patent is extended or adjusted under 35 U.S.C. 154(b) by 0 days.

(21) Appl. No.: 10/178,963

(22) Filed: Jun. 25, 2002

(65) Prior Publication Data

US 2002/0162680 A1 Nov. 7, 2002

Related U.S. Application Data

(63) Continuation-in-part of application No. 09/873,695, filed on Jun. 4, 2001, now abandoned.
(60) Provisional application No. 60/141,500, filed on Jun. 28, 1999, and provisional application No. 60/205,708, filed on May 19, 2000.

(51) Int. Cl.⁷ ................................................ H01R 13/46
(52) U.S. Cl. ..................... 174/65 R; 174/60; 174/64; 174/65 R; 220/3.3; 220/3.8
(58) Field of Search ............................ 174/60, 58, 59, 174/64, 65 R; 220/3.3, 3.92, 3.94, 4.02, 3.8; 29/825, 729

(56) References Cited

U.S. PATENT DOCUMENTS

| | | | |
|---|---|---|---|
| 2,277,217 A | | 3/1942 | Faber |
| 2,297,862 A | | 10/1942 | Bachmann |
| 2,320,400 A | | 6/1943 | Bedell |
| 2,738,482 A | * | 3/1956 | Benander ................. 439/441 |
| 2,920,303 A | | 1/1960 | Johnson |
| 3,240,869 A | | 3/1966 | Jureit |
| 3,297,815 A | | 1/1967 | Drettmenn |
| 3,350,501 A | | 10/1967 | Jureit |
| 3,417,192 A | | 12/1968 | Elm |
| 3,553,346 A | | 1/1971 | Ballantyne |
| 3,662,085 A | | 5/1972 | Robinson et al. |
| 3,724,795 A | | 4/1973 | Callanan |
| 3,852,514 A | * | 12/1974 | Lauben ...................... 174/58 |
| 3,860,739 A | | 1/1975 | Kloth et al. |
| 3,935,637 A | | 2/1976 | Bunnell |
| 3,951,502 A | | 4/1976 | Bromberg |
| 4,063,660 A | | 12/1977 | Ware |
| 4,082,915 A | | 4/1978 | Silver |
| 4,087,150 A | | 5/1978 | Kubik |
| 4,165,443 A | | 8/1979 | Figart et al. |
| 4,195,194 A | * | 3/1980 | Kuster et al. ................. 174/59 |
| 4,245,880 A | | 1/1981 | Zimmerman, Jr. et al. |
| 4,297,525 A | | 10/1981 | Bowden, Jr. |
| 4,306,109 A | | 12/1981 | Nattel |
| 4,428,492 A | | 1/1984 | Jorgensen |
| 4,500,746 A | | 2/1985 | Meehan |
| 4,534,486 A | | 8/1985 | Eidson |
| 4,536,612 A | * | 8/1985 | Domigan ..................... 174/48 |
| 4,599,484 A | * | 7/1986 | Bramwell ................. 174/52.1 |
| 4,669,804 A | | 6/1987 | Munroe |
| 4,733,330 A | | 3/1988 | Tanaka et al. |
| 4,787,587 A | | 11/1988 | Deming |
| 4,918,258 A | | 4/1990 | Ayer |
| 4,924,646 A | | 5/1990 | Marquardt |
| 5,178,350 A | | 1/1993 | Vink et al. |
| 5,180,886 A | | 1/1993 | Dierenbach et al. |
| 5,203,711 A | | 4/1993 | Bogiel |
| 5,223,673 A | | 6/1993 | Mason |

(List continued on next page.)

FOREIGN PATENT DOCUMENTS

WO    WO 01/01525 A1    1/2001

*Primary Examiner*—Dhiru R Patel
(74) *Attorney, Agent, or Firm*—Myers & Kaplan, LLC; Joel D. Myers; Ashish D. Patel

(57) ABSTRACT

A method of wiring and a dual-purpose wiring device that can expeditiously receive and electrically engage sheathed/insulated electrical conductors of an electrical cable, thus eliminating the time-consuming and laborious task of having to first unsheathe or strip the electrical conductors and thereafter mechanical engage the conductors to electrical contacts within the electric receptacle outlet box.

21 Claims, 10 Drawing Sheets

U.S. PATENT DOCUMENTS

| | | | |
|---|---|---|---|
| 5,326,931 A | * 7/1994 | Cain et al. | 174/48 |
| 5,448,011 A | 9/1995 | Laughlin | |
| 5,486,650 A | * 1/1996 | Yetter | 174/53 |
| 5,509,560 A | 4/1996 | Nash | |
| 5,560,397 A | * 10/1996 | Miller et al. | 138/110 |
| 5,683,267 A | 11/1997 | Ribbeck et al. | |
| 5,700,978 A | 12/1997 | Huff | |
| 5,709,566 A | 1/1998 | Tsuji et al. | |
| 5,720,626 A | 2/1998 | Dobbelaere et al. | |
| 5,744,750 A | 4/1998 | Almond | |
| 5,796,585 A | 8/1998 | Sugiyama et al. | |
| 5,895,888 A | 4/1999 | Arenas et al. | |
| 5,920,034 A | 7/1999 | Saka et al. | |
| 5,933,563 A | * 8/1999 | Schaffer et al. | 174/58 X |
| 5,965,844 A | 10/1999 | Lippa | |
| 6,229,087 B1 | * 5/2001 | Archer | 174/50 |
| 6,259,023 B1 | 7/2001 | Reiker | |

\* cited by examiner

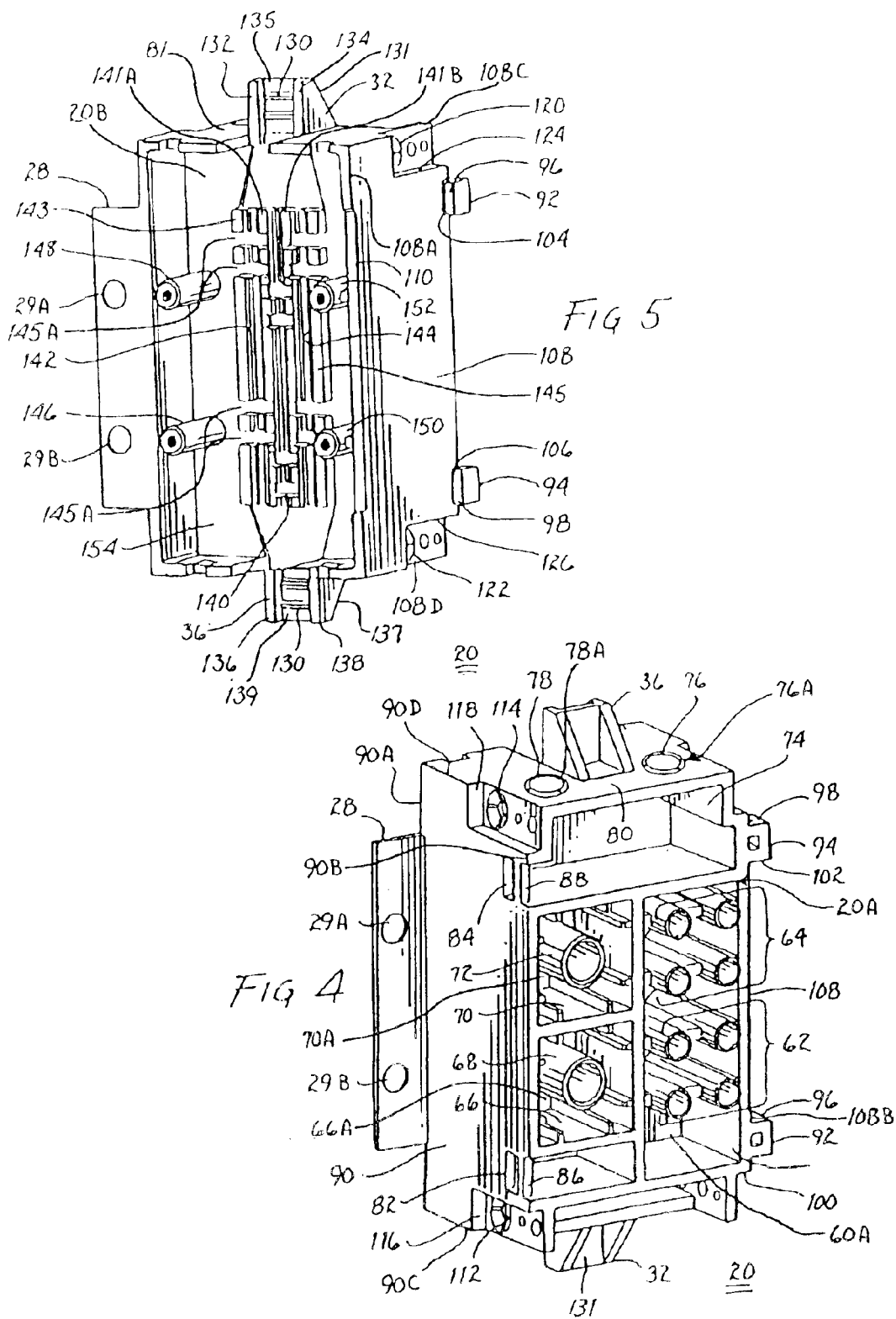

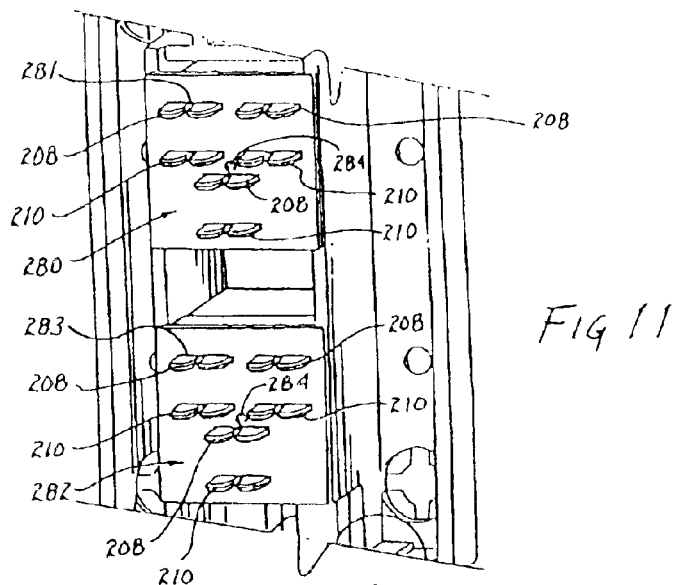
FIG 11
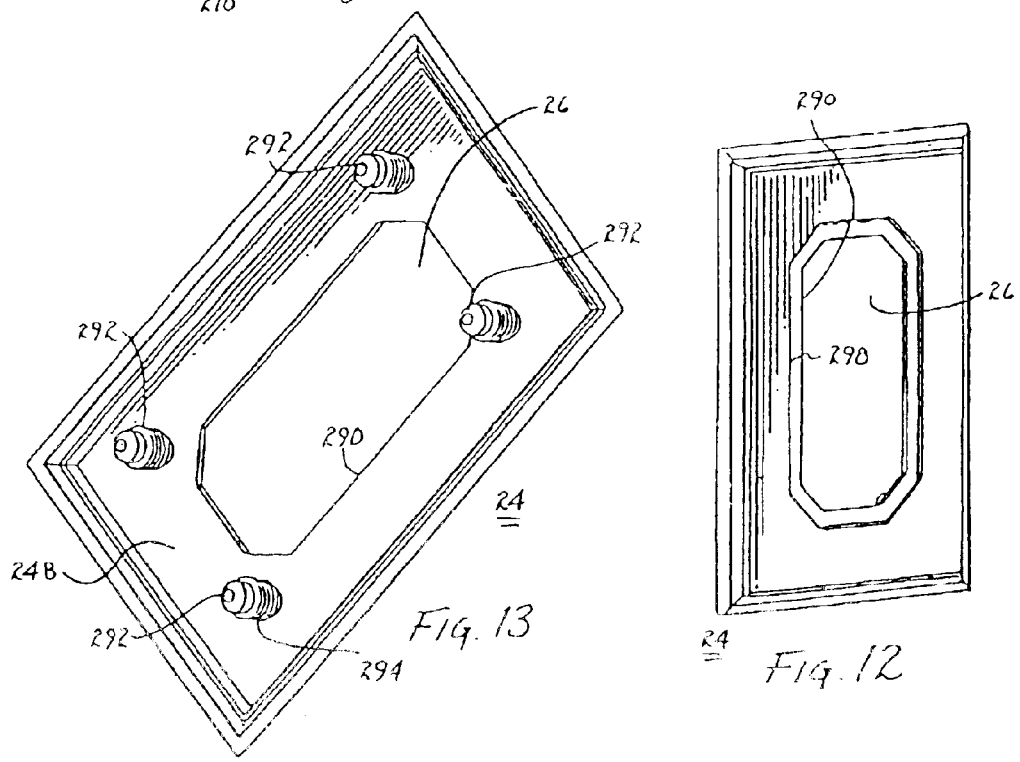
FIG. 13
FIG. 12
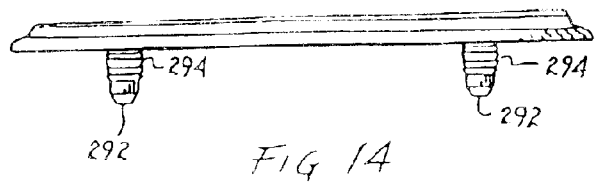
FIG 14

DUAL-PURPOSE WIRING DEVICE AND METHOD OF WIRING

PRIORITY CLAIM AND CROSS-REFERENCE TO RELATED APPLICATIONS

The present application is a continuation-in-part application of and claims priority to non-provisional application entitled "Electrical Outlet Box" filed Jun. 4, 2001, having assigned Ser. No. 09/873,695 now abandoned, wherein non-provisional application No. 09/873,695 claims priority to non-provisional application entitled "Electrical Outlet Box" filed Jun. 26, 2000, having assigned Ser. No. 09/602,884, and now issued on Jul. 10, 2001 as U.S. Pat. No. 6,259,023, wherein non-provisional application Ser. No. 09/602,884 claims priority to a provisional application entitled "Electrical Outlet Box", filed Jun. 28, 1999 and assigned Serial No. 60/141,500, and to a provisional application entitled "Electrical Receptacle With Straight-Through Wiring", filed May 19, 2000 and assigned Serial No. 60/205,708, which applications are incorporated herein by reference.

TECHNICAL FIELD

The present invention relates generally to electrical receptacle outlets and more specifically to a dual-purpose wiring device and method of wiring. The present invention is particularly suitable for, although not strictly limited to, receiving and electrically engaging one or more electrical conductors of a conventional electrical cable for ultimately providing electrical power to sockets selectively engageable by electrical plugs.

BACKGROUND OF THE INVENTION

Conventional wall mounted electrical receptacle outlets typically include a metal or plastic box and a receptacle mounted within the box for receiving three electrical conductors of a conventional electrical cable. The terminal end of each conductor is usually mechanically fastened to electrical contacts of the receptacle, wherein the electrical contacts correspond to a conventional socket receptacle assembly. Moreover, removal of one or more knockouts formed on the box expose apertures through which ingress of a cable and egress of another cable is permitted. In the event of the latter, the ends of each conductor of such cable must be attached to the corresponding electrical connections of the socket receptacle assembly. Alternatively, additional conductors that are not mechanically connected to the electrical receptacle are usually electrically and mechanically secured to one another with a device known as a wire nut, wherein the stripped end of each conductor is secured to one another via a wire nut to provide electrical power and/or ground the corresponding electrical contact of the socket assembly.

Generally, a substantial amount of time and effort is expended in wiring a home with conventional electrical receptacle boxes. In preparation for wiring electrical cable, access holes are typically drilled through wall studs to allow the routing of electrical cables therethrough, and electrical boxes are secured to wall studs in their preferred locations by nails or the like. Thereafter, knockouts formed on the electrical boxes are removed to expose apertures for the ingress and egress of electrical cable therethrough. Electrical cable must usually be pulled through the access holes of each stud and then through designated outlet holes, whereupon individual lengths of the cable are cut to accommodate the looping of cable from one wire box to another. The use of ten electrical boxes, for instance, will generally result in ten separate lengths of cable between each electrical box.

To create an electrical connection between the cables and their respective wire boxes, the ends of each electrical cable are unsheathed to expose the three conventional insulated electrical conductors, wherein each individual conductor is then stripped and inserted into the electrical box for connection to electrical contacts therein. Any extraneous wiring not intended to be attached to the electrical receptacle is then secured by wire nuts and pushed back into the electrical box to ready the house for wallboard installation.

Following wallboard installation, mudding and painting, an electrician must usually return to complete the wiring and installation process of the electrical receptacles. Exposed wire ends of each conductor are looped and mechanically attached to each electrical receptacle, and each electrical receptacle is then secured inside the electrical box. The final step of the installation process is the flush attachment of the electrical receptacle cover plate with the surface of the wallboard. Often times however, due to poor workmanship and/or inattentiveness, the electrical outlet box is improperly aligned with the wallboard. The result is an aesthetically displeasing and skewed attachment of the cover plate, as no provision for aligning the cover plate with the wallboard was present.

Once power is applied, each receptacle is tested. Rectification of any problems associated with the testing process may involve tracing the malfunction to mechanical disconnections, removal of the affected electrical receptacle, tightening of mechanical attachments and/or reinstallation.

In addition to being a commanding and lengthy task, wiring a house or building is often very expensive, as the cost of parts and/or electrical cables is typically substantially less than the cost of labor. As such, by reducing the frequency of visits to a job site, stocking a single version of an electrical box, reducing the skill level of the electrician and corresponding labor costs, and/or reducing the time and effort expended in wiring a house/building, significant savings can be achieved.

Therefore, it is readily apparent that there is a need for a dual-purpose wiring device and method of wiring, wherein the dual-purpose wiring device can expeditiously receive and electrically engage uncut, sheathed electrical conductors of a conventional electrical cable, thus eliminating time-consuming and laborious prior art methods of having to first cut and unsheathe the electrical cable, strip the three enclosed electrical conductors, and then loop and mechanically engage each exposed wire of each conductor to three electrical contacts within an electric outlet receptacle mounted inside the electrical box, and thereafter having to repeat the same for each electric outlet receptacle box in a home or building.

BRIEF SUMMARY OF THE INVENTION

Briefly described, in a preferred embodiment, the present invention overcomes the above-mentioned disadvantages and meets the recognized need for such a device by providing a method of wiring a dual-purpose wiring device without the use special tools, wherein the dual-purpose wiring device can expeditiously receive and electrically engage one or more uncut and sheathed electrical conductors of a conventional electrical cable, thus eliminating the time-consuming and laborious task of having to first cut and unsheathe/strip each electrical conductor, and thereafter mechanically engage each conductor to electrical contacts within the electric receptacle outlet box.

According to its major aspects and broadly stated, the present invention in its preferred form is a dual-purpose wiring device having a female member and a male member dimensioned to be received by the female member, wherein the female member preferably possesses pathways for retaining therein individual uncut and sheathed electrical conductors of an electrical cable, and wherein the male member preferably possesses receivers for penetrating each conductor and creating an electrical contact therewith.

More specifically, the present invention is a method of wiring and a dual-purpose wiring device having a female member dimensioned to receive a male member, wherein the female member preferably possesses pathways or retaining slots for the individual retention therein of sheathed and uncut electrical conductors of a preferably conventional electrical cable. The primary insulative sheath that typically collectively surrounds all three electrical conductors is preferably first removed so as to expose the three sheathed/insulated conductors and to thereafter allow their individual placement and retention within their respective pathway or retaining slot of the female member. The male member preferably engages the female member, whereupon receivers within the male member preferably engage and penetrate the sheathing/insulation of each respective conductor, thus accessing the wires contained therein and creating an electrical contact therewith. Each receiver preferably corresponds with a prong of a conventional grounded three-prong plug, thereby permitting the plug to electrically connect with the corresponding electrical conductors upon insertion of the plug into a socket. As such, all of the conventional steps of stripping, cutting and mechanically attaching the electrical conductors to an electrical outlet box are eliminated.

Each receiver of the male member may include one or more spring-loaded tangs for receiving and electrically connecting an additional conductor of another cable. A positional cover-plate is placed flush with the surface of the wallboard surrounding the dual-purpose wiring device and preferably accommodates for any misalignment of the device relative to the surface of the wallboard via positioning studs. A preferred fastening means is provided on each dual-purpose wiring device to permit side-by-side and/or back-to-back mounting of a plurality of dual-purpose wiring devices, wherein a single uncut cable can be serially routed through each dual-purpose wiring device. To enhance routing of cables through a wall, a notch or slot is preferably cut in the side of each stud to receive a cable, whereupon a retainer preferably engages the slot and maintains the cable securely therein, thus eliminating conventional hole boring into each stud and the threading of each cable therethrough.

A feature and advantage of the present invention is its ability to provide electrical power to an outlet without requiring the cutting and/or stripping of individual conductors of an electrical cable.

A feature and advantage of the present invention is the security and safety provided through utilization of uncut cable.

A feature and advantage of the present invention is its ability to eliminate the extraneous process of having to strip and mechanically fasten conductors to their respective electrical receptacles.

A feature and advantage of the present invention is its ability to be easily installed without use of special tools.

A feature and advantage of the present invention is its ability to be easily installed using one continuous electrical cable, and to be easily electrically connected by eliminating conventional processes of cutting, stripping, looping and mechanically connecting each electrical conductor to an electrical outlet receptacle box.

A feature and advantage of the present invention is its ability to expeditiously provide electrical connection between an electrical socket and uncut/unstripped electrical conductors connected therewith.

A feature and advantage of the present invention is its ability to reduce stocking requirements for wholesalers, retailers and electricians by eliminating the need for wirenuts as they relate to wiring receptacles, and reduce the stocking of both single and multiple receptacle electrical outlet boxes by providing a dual purpose wiring device that can be mounted side-by-side and/or back-to-back in multiple configurations.

A feature and advantage of the present invention is its ability to reduce the number of component parts required for its manufacture, thus substantially reducing the cost of the device as compared to conventional and available electrical receptacle boxes.

A feature and advantage of the present invention is its ability to be installed with minimal instruction and with substantial ease, thus lowering the requisite skill level and associated cost of the installation electrician.

A feature and advantage of the present invention is its ability to provide a means for easily and consistently mounting a cover plate flush and square with an electrical outlet box.

A feature and advantage of the present invention is its ability to provide an apparatus and method of wiring that eliminates the need of wire nuts typically utilized in conventional methods of wiring a home.

A feature and advantage of the present invention is its ability to provide an apparatus and method that facilitates the joining of a plurality of electrical boxes in series without the need for additional attaching means or tools.

A feature and advantage of the present invention is its ability to reduce labor costs typically associated with electrically wiring a house, building or similar facility.

A feature and advantage of the present invention is its ability to provide a method for inexpensively wiring a house, building or similar facility.

These and other objects, features and advantages of the present invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Alternate Embodiments with reference to the accompanying drawing figures, in which like reference numerals denote similar structures and refer to like elements throughout, and in which:

FIG. 4 is a rear perspective view of the female member of a dual-purpose wiring device according to a preferred embodiment of the present invention.

FIG. 5 is a front perspective view of the female member of a dual-purpose wiring device according to a preferred embodiment of the present invention.

FIG. 11 is a partial rear perspective view of the male member of a dual-purpose wiring device according to a preferred embodiment of the present invention.

FIG. 12 is a front perspective view of the cover for the male member of a dual-purpose wiring device according to a preferred embodiment of the present invention.

FIG. 13 is a rear perspective view of the cover for the male member of a dual-purpose wiring device according to a preferred embodiment of the present invention.

FIG. 14 is a side view of the cover for the male member of a dual-purpose wiring device according to a preferred embodiment of the present invention.

DETAILED DESCRIPTION OF THE PREFERRED AND ALTERNATE EMBODIMENTS

In describing the preferred, as illustrated in FIGS. 1–26, and alternate embodiments of the present invention, specific terminology is employed for the sake of clarity. The invention, however, is not intended to be limited to the specific terminology so selected, and it is to be understood that each specific element includes all technical equivalents that operate in a similar manner to accomplish similar functions.

Figure 1:
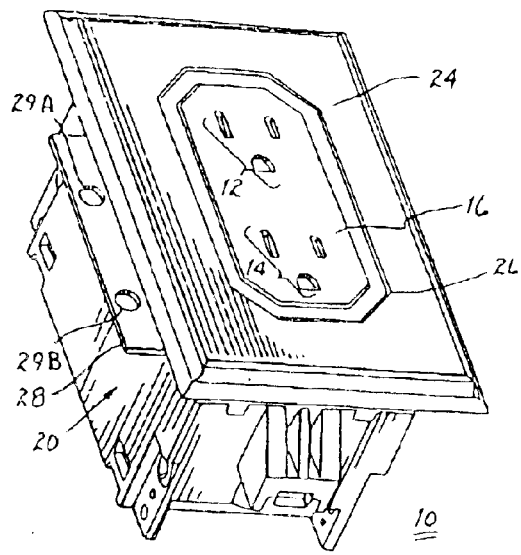
FIG. 1 is a perspective view of a dual-purpose wiring device according to a preferred embodiment of the present invention.

Referring now more specifically to FIG. 1, the present invention in its preferred embodiment is a dual-purpose wiring device 10, wherein device 10 is preferably box-like and provides electrical power to each of socket sets 12 and 14 preferably disposed in socket assembly 16 of device 10. Device 10 preferably includes a female member 20 dimensioned to receive a male member 22, wherein male member 22 subsequently receives cover 24, and wherein cover 24 has an aperture 26 formed therethrough from which socket assembly 16 protrudes. A flange 28 extends preferably laterally from female member 20 and preferably includes throughholes 29A and 29B formed therethrough for penetrably receiving nails, screws or the like for attachment of female member 20, and device 10 in general, to a wall stud or other supporting means.

Figure 2:
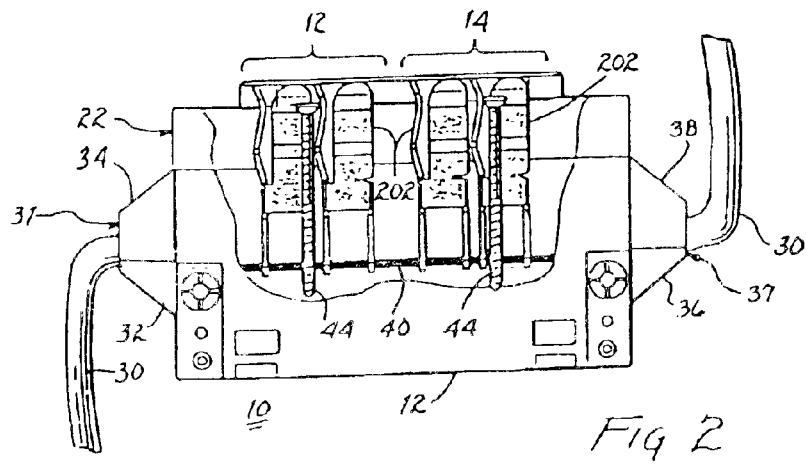
FIG. 2 is a partial side cutaway view of a dual-purpose wiring device according to a preferred embodiment of the present invention.

Referring now more specifically to FIG. 2, an overview of device 10 is provided therein. An electrical cable 30 preferably enters device 10 intermediate the junction between female member 20 and male member 22 through an aperture 31 defined by ledges 32 and 34 of female member 20 and male member 22, respectively. Similarly, cable 30 preferably exits from device 10 preferably intermediate the junction between female member 20 and male member 22 through an aperture 37 defined by ledges 36 and 38 of female member 20 and male member 22, respectively. The portion of cable 30 enclosed with the interior of device 10 has been stripped of its external sheath, if applicable, to expose three sheathed or insulated conventional electrical conductors 40—positive, neutral and ground. As best shown in FIG. 5, female member 20 preferably possesses retaining slots or pathways 140, 142 and 144 that are preferably dimensioned to receive one of conductors 40. Although pathways are preferred, a single or plurality of retaining members capable of retaining electrical conductors 40 in their desired position may be utilized. Socket sets 12 and 14, formed in male member 22, each preferably possess three receivers 202 (also shown in FIGS. 9, 11, 17 and 18) that are positioned to individually contact a corresponding conductor 40. As such, upon joining male member 22 with female member 20, each of receivers 202 preferably penetrates its respective conductor 40 and makes electrical contact therewith. Therefore, each of socket sets 12 and 14 are in electrical contact with the three conductors 40 of cable 30 and will provide electrical power to a preferably conventional grounded three-prong plug plugged into either of socket sets 12 or 14. Male member 22 preferably maintains contact with female member 20 via a plurality of screws or bolts 44. From this description, it will be apparent that cable 30 preferably remains uncut so as to provide electrical power to either of socket sets 12 or 14, and is thus preferably continuous through device 10.

Figure 3:
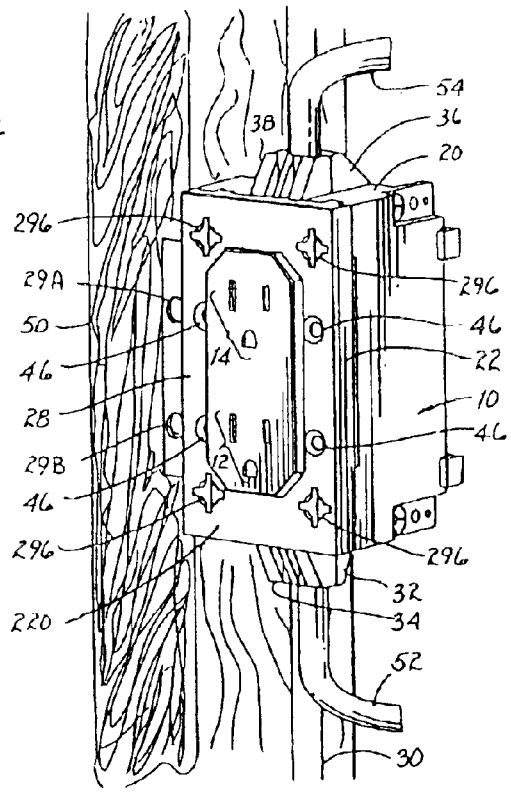
FIG. 3 is a perspective view of a dual-purpose wiring device according to a preferred embodiment of the present invention, showing the device attached to a conventional stud.

Referring now more specifically to FIG. 3, illustrated therein is a preferred mounting scheme of dual-purpose wiring device 10. Female member 20 is preferably placed adjacent a stud 50 found in a typical wall construction or other supporting means, and preferably fastened thereto via insertion of bolts or screws through throughholes 29A and 29B of flange 28 and thereafter into threaded engagement with stud 50. Alternatively, nails, tacks and/or other suitable fastening devices may be utilized to fasten female member 20 to stud 50. After mounting female member 20 to stud 50, conductors 40 of cable 30 are preferably laid therein and secured within their respective pathways 140, 142 and 144. Upon attachment of male member 22 to female member 20, sockets 12 and 14 of male member 22 will be in electrical contact with the corresponding conductors 40 of cable 30. Screws or bolts 44 are preferably inserted through throughholes 46 of cover element 220 and preferably into threaded engagement with female member 20 to retain male member 22 in place. As will be discussed in further detail below, additional conductors within additional cables 52 and 54 may be attached to corresponding receivers 202 of either of socket sets 12 or 14 so as to provide electrical power to other locations.

Referring now to FIG. 4, details attendant female member 20 will be described herein. Female member 20 is preferably generally substantially rectangular-shaped and box-like, and is preferably formed from a non-electrically conductive material, such as, for exemplary purposes only, plastic; although other suitable materials may be utilized. Rear wall 20A of female member 20 is preferably essentially divided into four recessed sections 60, 66, 70 and 74, wherein sections 60 and 74 are preferably substantially rectangular-shaped recessions and sections 66 and 70 are preferably substantially square-shaped recessions; although other suitable shaped recessions may be utilized. Extending preferably from base 60A of section 60 is preferably first set of tubes 62 and second set of tubes 64, wherein first set of tubes 62 and second set of tubes 64 preferably have four tubes per set arranged in a square-like fashion. Although four tubes per set are preferred, any number of tubes can be utilized to construct first set of tubes 62 and second set of tubes 64. Extending preferably from base 66A of section 66 is preferably a single tube 68 having a diameter preferably essentially corresponding to a circle inscribed by the peripheral edges of the tubes of first set of tubes 62. Extending preferably from base 70A of section 70 is also preferably a single tube 72 having a diameter preferably equivalent to a circle inscribed by the tubes of second set of tubes 64. Upon back-to-back placement of two female members 20, tubes 68 and 72 of one female member 20 preferably engage and nest within first set of tubes 62 and second set of tubes 64, respectively, of the other female member 20. The resulting tight and frictional fit between the respective tubes enables the two dual-purpose wiring devices 10 to be securely mounted and/or interlocked with one another. Although the tubular shaped structures are preferred for creating the interlocking relationship/mechanism between tubes 68 and 72 and first set of tubes 62 and second set of tubes 64, respectively, of interacting female members 20, it is contemplated in an alternate embodiment, that different shaped protrusion may be utilized, such as, for exemplary purposes only, square, rectangular, triangular and/or other similar designs or interlocking mechanisms. Additionally, it is further contemplated in an alternate embodiment that any number of tubes can be utilized to effect an interlocking relationship between two or more female members 20.

Formed preferably above sections 70 and 60 and on rear wall 20a of female member 20 is recessed section 74, wherein section 74 is preferably a substantially rectangular-shaped compartment that may be covered by cover 166, as more fully described below. A pair of preferably circular-shaped knockouts 76 and 78 are preferably disposed one wall 80 of female member 20, wherein knocking out or removal of knockouts 76 and 78 preferably forms apertures 76A and 78A, respectively, for insertion therethrough of conductors 160 and 162 for the electrical joining thereof, as more fully described below. Placement of cover 166 over section 74 preferably functions to shield any conductors electrically joined therein, thus precluding the possibility of an electrical hazard as a result of any exposed conductors.

Formed preferably at edge 90A of side wall 90 is flange 28, wherein flange 28 is a preferably rectangular-shaped plate formed preferably perpendicular to side wall 90. Flange 28 preferably possess throughholes 29A and 29B formed thereon, wherein throughholes 29A and 29B preferably receive bolts, screws, or the like to attach female member 20 to a stud. Formed preferably on side wall 90 of female member 20, proximal rear wall 20A of female member 20, are slots 82 and 84. Formed preferably parallel to slots 82 and 84, on edge 90B of side wall 90, are indentations 86 and 88. Formed preferably on side wall 180, opposite side wall 90, are snap studs 92 and 94, wherein snap studs 92 and 94 are preferably substantially rectangular-shaped protrusions formed proximal to rear wall 20A and coincident with edge 108B of wall 108.

To adjacently join two female members 20, slots 82 and 84 and indentions 86 and 88 of a first female member 20 are preferably aligned and engaged with snap studs 92 and 94 of an adjacently placed female member 20, thus mechanically locking/interlocking the adjacent female members 20 to one another, whereupon additional female members 20 may be attached to create a team or group of adjacently interconnected devices 10. Specifically, lip 96 of snap stud 92 of one female member 20 is preferably placed adjacent wall 90 of another female member 20. Lip 98 of snap stud 94 is similarly preferably placed adjacent wall 90 of the other female member 20. Upon such joining, base 100 of snap stud 92 and base 102 of snap stud 94 will preferably rest within indentations 86 and 88, respectively. A protrusion 104 at the extremity of lip 96 of snap stud 92 and a protrusion 106 at the extremity of lip 98 of snap stud 94 will preferably lodge into slots 82 and 84, respectively, thus interlocking the two female members 20 together. To accommodate such side-by-side mounting of a pair of female members 20, edge 108A of wall 108 preferably possess an indentation 110 formed therein, wherein indentation 110 is preferably dimensioned to accommodate and receive flange 28, thereby enabling wall 90 of one female member 20 to sit flush with wall 108 of an adjacently joined second female member 20. It is recognized in an alternate embodiment, that other suitable interconnecting and/or locking mechanisms that enable adjacent joining of female members 20 can be utilized, such as, for exemplary purposes only, lock-and-key type mechanisms.

Formed preferably at edges 90C and 90D of side wall 90 of female member 20 are indentations 116 and 118, respectively, wherein indentations 116 and 118 preferably possess throughholes 112 and 114, respectively, formed therethrough. Similarly, formed preferably at edges 108C and 108D of side wall 108 of female member 20 are indentations 124 and 126, respectively, wherein indentations 124 and 126 preferably possess throughholes 120 and 122, respectively, formed therethrough. Throughholes 112, 114, 120 and 122 preferably permit insertion of bolts therethrough to mechanically secure two or more female members 20 adjacent to one another in a grouped fashion. Each of throughholes 112, 114, 120 and 122 may include a spider-shaped head which would flatten out in the event of over tightening of a penetrating bolt, thereby preventing cracking or damage to the wall of the corresponding indentation 116, 118, 124 and 126.

Referring now to FIG. 5, further details attendant female member 20 will be described herein. Front wall 20B of female member 20 preferably possesses recessed wall 154, wherein recessed wall 154 preferably possesses pathways 140, 142 and 144 formed thereon for retention therein of three conventional sheathed/insulated electrical conductors 40 of cable 30. Specifically, pathway 140 is preferably defined by parallel ridges 141A and 141B and is preferably sandwiched between pathway 142 and 144, wherein pathway 142 is preferably defined by parallel ridges 143 and 141A, and pathway 144 is preferably defined by parallel ridges 141B and 145. Each of ridges 143, 141A, 141B and 145 preferably possess discontinuity areas 145A, dimensioned to accommodate receivers 202 as more fully described below. Pathways 140, 142 and 144 are each preferably dimensioned to receive and securely retain one of three conventional conductors 40 of cable 30. Preferably, the primary sheath or insulative cover of cable 30 surrounding the three conductors 40 is removed along the segment of the cable enclosed within female member 20, wherein the sheathing or insulative covers of each individual conductor 40 is preferably retained or not removed. (It should be noted that the use of the word pathway defines a routing for each electrical conductor 40. Any alternative word such as retaining slot, channel, depression, alignment means and/or groove and/or any other suitable descriptive word could serve to define the pathway in which electrical conductors 40 are retained, and should therefore be considered within the scope of this patent.)

Formed preferably on side wall 81, opposite side wall 80, of female member 20, is ledge 32, having a preferably triangular shape and possessing side walls 132 and 134, slope 131 and face 135, wherein face 135 is preferably concomitant with recessed wall 154 of female member 20. Similarly, formed preferably on side wall 80 of female member 20 is ledge 36, having a preferably triangular shape and possessing side walls 136 and 138, slope 137 and face 139, wherein face 139 is preferably concomitant with recessed wall 154 of female member 20. Preferably, ledges 32 and 36 provide support for cable 30 extending through female member 20. Ledges 32 and 36 further each preferably possess laterally oriented ridges 130 formed on faces 135 and 139, respectively, wherein ridges 130 preferably function to securely and frictionally maintain cable 30 within ledges 32 and 36 of female member 20. Side walls 132 and 134 of ledge 32 and side walls 136 and 138 of ledge 36 preferably further assist in preventing lateral movement of cable 30.

Preferably, tubular-shaped posts 146 and 148 extend upwardly from recessed wall 154 of female member 20, proximal to ridge 143 of pathway 142. Similarly, tubular-shaped posts 150 and 152 extend preferably upwardly from recessed wall 154 of female member 20, proximal to ridge 145 of pathway 144. Posts 148 and 152 are preferably aligned with throughholes 29A of flange 28 and posts 146 and 150 are preferably aligned with throughholes 29B of flange 28. Upon placement of flange 28 of one female member 20 on indentation 110 of an adjacent female member 20, throughhole 29A of flange 28 preferably slidably engages post 152 and throughhole 29B preferably slidably engages post 150, thus locking flange 28 of the corresponding female member 20 thereto to provide a robust attachment between the two adjacent female members 20. In a similar, fashion, multiple female members 20 can be adjacently interconnected with one another.

Figure 6:
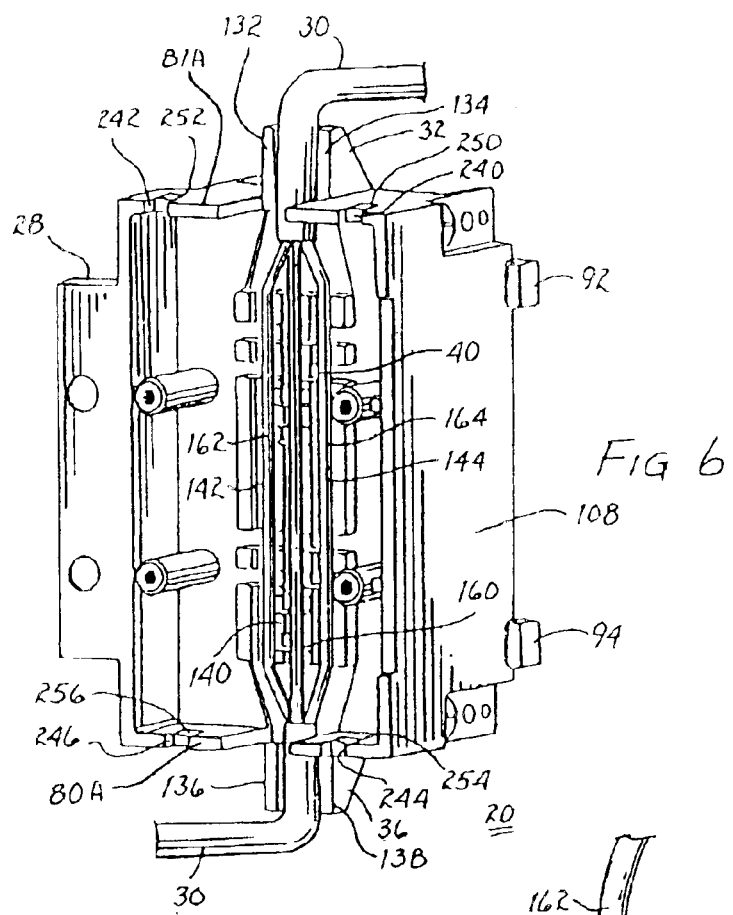
FIG. 6 is a front perspective view of the female member of a dual-purpose wiring device according to a preferred embodiment of the present invention, showing conductors placed therein.

Referring now to FIG. 6, illustrated therein is female member 20 having electrical conductors 160, 162 and 164 of cable 30 inserted within pathways 140, 142 and 144, respectively. Similarly, cable 30 has been placed within ledges 32 and 36 and retained therein by respective side walls 132 and 134, and 136 and 138.

Figure 7:
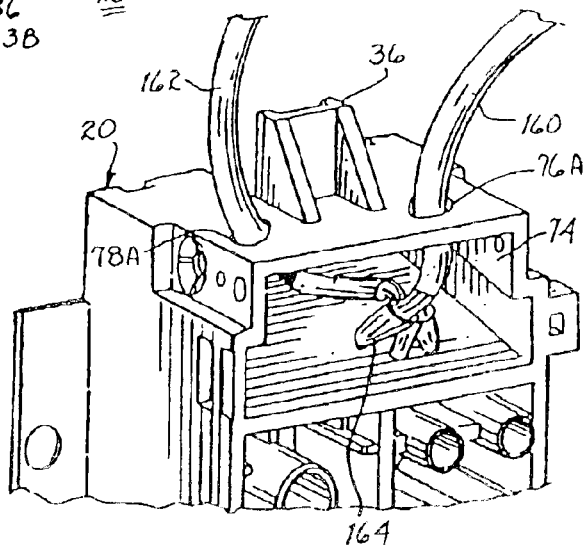
FIG. 7 is a partial rear perspective view of the female member of a dual-purpose wiring device according to a preferred embodiment of the present invention.
Figure 8:
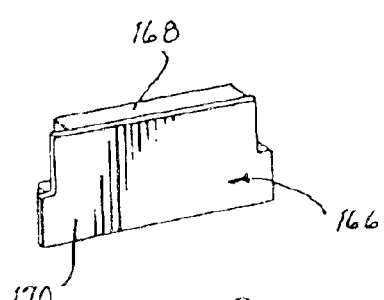
FIG. 8 illustrates a cover for closing a compartment of the female member as illustrated in FIG. 7.

Referring now to FIG. 7, specifically illustrated therein is recessed section 74 of rear wall 20A of female member 20, wherein section 74 preferably functions to house and/or contain the electrical connection between conductors 160 and 162 inserted therein through apertures 76A and 78A, respectively, formed by removing knockouts 76 and 78, respectively. The ends of conductors 160 and 162 may be electrically interconnected by utilizing wing nuts 164 or the like. To eliminate and/or reduce the risk of an electrical hazard as a result of exposed and uninsulated ends of conductors 160 and 162 within section 74, cover 166 preferably engages section 74 and thus encloses and/or shields conductors 160 and 162 therein, as best illustrated in FIG. 8. Cover 166 preferably includes depending skirt 168 formed thereon, wherein skirt 168 is of reduced area as compared to section 74 so as to permit snug insertion of skirt 168 within section 74 upon engagement of cover 166 therewith. Furthermore, upon engagement of cover 166 with section 74 of female member 20, surface 170 of cover 166 is preferably flush with rear wall 20a. Preferably, cover 166 is secured within section 74 by snap-fit action with assistance from depending skirt 166 as known within the art, or can alternatively be secured therewith via any other known securing and/or closing means, such as, for exemplary purposes only, resilient locking tabs, screws, hinges and/or any other suitable securing and/or closing means.

Figure 9:
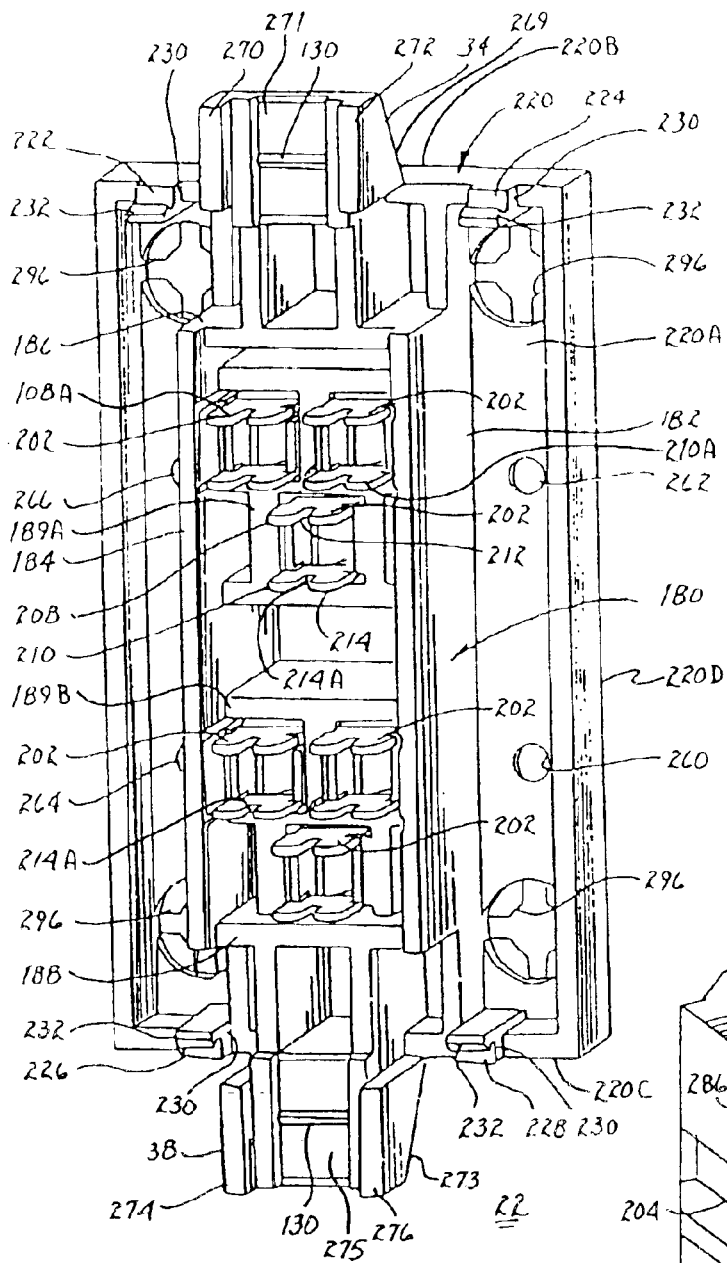
FIG. 9 is a rear perspective view of the male member of a dual-purpose wiring device according to a preferred embodiment of the present invention.
Figure 10:
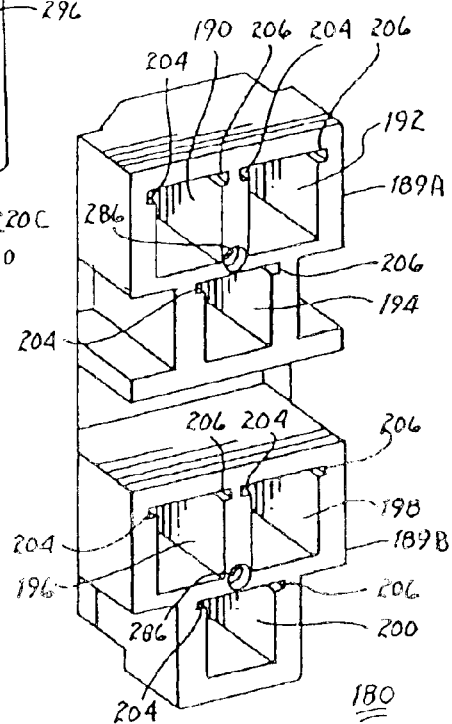
FIG. 10 is a partial front perspective view of the male member of a dual-purpose wiring device according to a preferred embodiment of the present invention.

Referring now to FIGS. 9, 10, 10A and 11, male member 22 will be described with joint reference thereto. Male member 22 is preferably generally a rectangular-shaped cover plate 220 dimensioned to be received by female member 20. Cover plate 220 preferably possess centrally positioned section 180 formed thereon, wherein section 180 is preferably defined by side walls 182, 184, 186 and 188 extending upwardly from rear side 220a of cover plate 220 of male member 22. Enclosed within walls 182, 184, 186 and 188 of section 180, are socket structures 189A and 189B, as best illustrated in FIGS. 9 and 10. Specifically, socket structure 189A is preferably generally square-shaped and possesses square-shaped apertures 190, 192 and 194 arranged in a preferably inverted triangular fashion that preferably corresponds with the arrangement of the three prongs of a conventional three-pronged plug and with socket 12, as more fully described below. Similarly, socket structure 189B is preferably generally square-shaped and possesses square-shaped apertures 196, 198 and 200 arranged in a preferably inverted triangular fashion that preferably corresponds with the arrangement of the three prongs of a conventional three-pronged plug and with socket 14, as more fully described below.

Figure 10A:
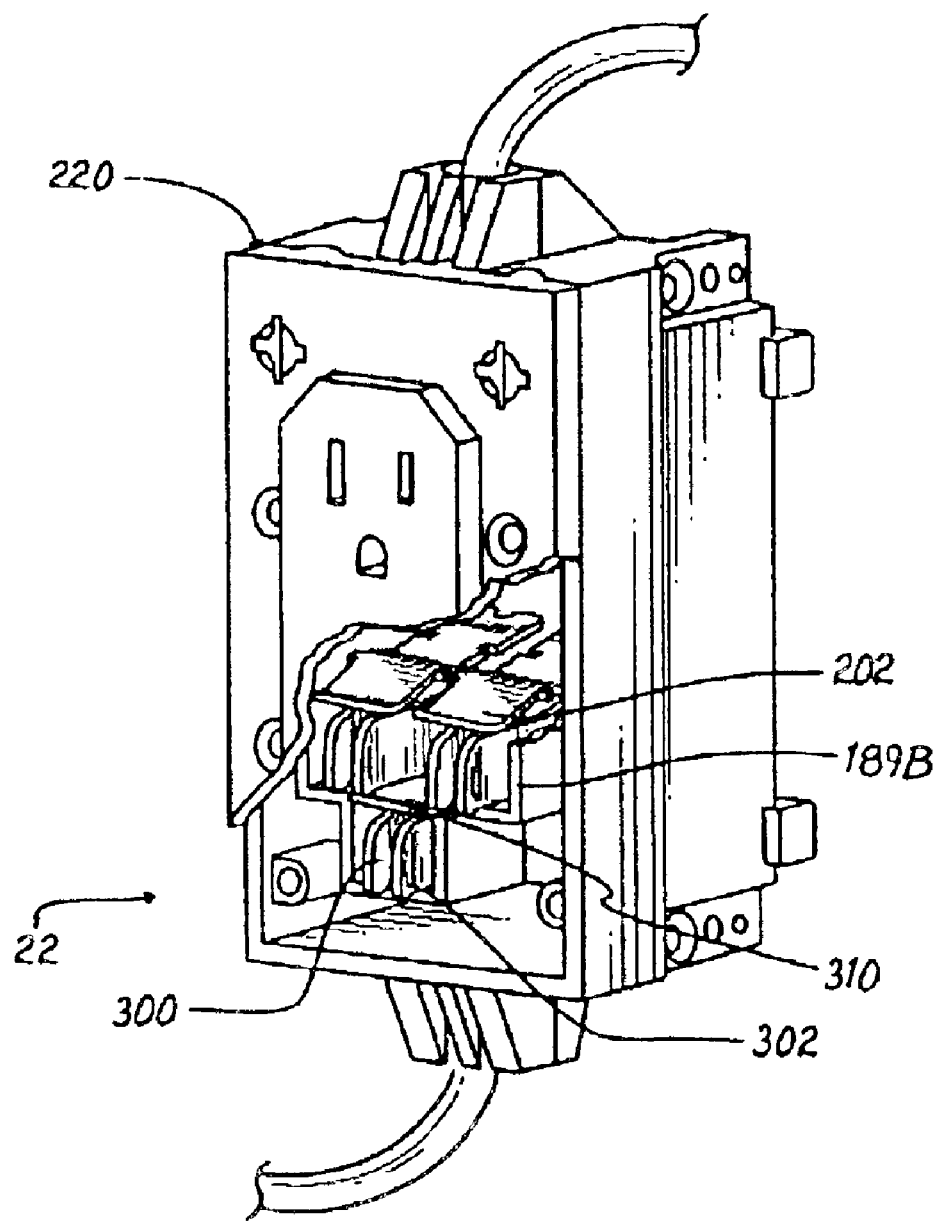
FIG. 10A is a front partial cut-away view of the male member of a dual-purpose wiring device according to a preferred embodiment of the present invention.

Each of apertures 190, 192, 194, 196, 198 and 200 of corresponding socket structures 189A and 189B are preferably dimensioned to receive a receiver 202, as best illustrated in FIG. 10A. Each of apertures 190, 192, 194, 196, 198 and 200 preferably possess opposingly formed slots 204 and 206 for receiving corresponding keys 312 and 314 of receiver 202, as more fully described below. As more fully described below, each receiver 202 preferably includes a pair of parallel tabs 208 and 210 having slots 212 and 214, respectively. Preferably, edges 208A and 210A of tabs 208 and 210, respectively, including edges 212A and 214A of slots 212 and 214, respectively, of each receiver 202 are tapered or beveled so as to provide a cutting function for penetrating the insulation surrounding individual conductors 40 retained within their respective pathways 140, 142 and 144 of female member 20 when male member 22 is engaged therewith. Specifically, each pathway 140, 142 and 144 is individually aligned with slots 212 and 214 of tabs 208 and 210, respectively, of a corresponding receiver 202, so as to permit a conductor 40 placed within each of pathways 140, 142 and 144 to contact slots 212 and 214 of tabs 208 and 210, respectively, of the corresponding receiver 202. As such, upon attachment of male member 22 to female member 20, receivers 202 will come into engagement with a corresponding one of conductors 40 and create an electrical connection therewith by penetrating the sheathing/insulation surrounding each conductor 40 via beveled edges 208A and 212A of tab 208 and slot 212, respectively, and beveled edges 210A and 214A of tab 210 and slot 214, respectively, of receivers 202, thus supplying power to each of sockets 12 and 14 of device 10. Tabs 208 and 210 of each receiver 202 preferably extend into discontinuity areas 145A of ridges 143, 141A, 141B and 145 of pathways 140, 142 and 144, wherein discontinuity areas 145A are best illustrated in FIGS. 5 and 6.

Male member 22 preferably engages female member 20 via cover element 220, wherein cover element 220 is preferably dimensioned to be received by female member 20. Cover element 220 preferably possess male studs 222 and 224 depending from edge 220B of cover element 220, proximal the corners of cover element 220, and opposing male studs 226 and 228 depending from edge 220C of cover element 220, proximal the opposing corners of cover element 220, wherein each male stud 222, 224, 226 and 228 is preferably substantially rectangular-shaped and possesses a base section 230 and an overhanging lip 232 that terminates each of male studs 222, 224, 226 and 228. Referring back to FIG. 6, therein is illustrated slots 240 and 242 formed on edge 81A of wall 81, and slots 244 and 246 formed on edge 80A of wall 80, wherein slots 240, 242, 244 and 246 are preferably dimensioned to receive bases 230 of respective male studs 222, 224, 226 and 228 of cover element 220. Apertures 250, 252, 254 and 256 disposed preferably adjacent slots 240, 232, 244 and 246, respectively, preferably each engage overhanging lips 232 of respective male studs 222, 224, 226 and 228 in a snap-fit fashion, thus allowing male member 22 to be attached to female member 22 in a snap-fit action. Preferably, the distance between slots 240 and 242 of wall 81 is greater than the distance between slots 244 and 246 of wall 80. Similarly, the distance between male studs 222 and 224 of cover element 220 is greater than the distance between male studs 226 and 228 of cover element 220, wherein the distance between male studs 222 and 224 is preferably equal to the distance between slots 240 and 242 of wall 80, and wherein the distance between male studs 226 and 228 is preferably equal to the distance between slots 244 and 246 of wall 80 so as to ensure correct orientation of male member 22 with female member 20, as mating of male member 22 with female member 20 can only come about if male studs 222, 224, 226 and 228 are coincident with respective slots 240, 242, 244 and 246, thus permitting male member 22 to be attached only one way to female member 20.

Formed preferably through cover element 220 of male member 22 are throughholes 260, 262, 264 and 266, wherein throughholes 260, 262, 264 and 266 preferably correspondingly align with and engage posts 146, 148, 150 and 152, respectively, of female member 20 when female member 20 is engaged with male member 22. After the initial snap fit attachment of male member 22 with female member 20, bolts or screws 44 are preferably inserted through throughholes 260, 262, 264 and 266 and thereafter into threaded engagement with corresponding posts 146, 148, 150 and 152, thus preventing any inadvertent disengagement between male member 22 and female member 20.

Formed preferably on edges 220B and 220C of cover element 220 of male member 22 are ledges 34 and 38, respectively, wherein ledges 34 and 38 of male member 22 are preferably similar in structure to ledges 32 and 36 of female member 20 and serve essentially the same function. Specifically, ledge 34 preferably possesses side walls 270 and 272, slope 269 and face 271. Similarly, ledge 38 preferably possesses side walls 274 and 276, slope 273 and face 275. Faces 271 and 275 of ledges 34 and 38, respectively, also preferably possess lateral ridges 130 formed thereon for compressively engaging the portion of cable 30 encased therein when ledges 34 and 38 of male member 22 are brought into contact with ledges 32 and 36, respectively, of female member 20. Preferably, side walls 270 and 272 of ledge 34 and side walls 274 and 276 of ledge 38 engage corresponding side walls 132 and 134 of ledge 32 and side walls 136 and 138 of ledge 36, respectively, of female member 20, thus encasing a portion of cable 30 therebetween and simultaneously prohibiting any movement of cable 30 within device 10.

Referring specifically now to FIG. 11, therein is illustrated preferably square-shaped plate 280 for engaging socket structure 189A, preferably having slots 281 formed therethrough, wherein slots 281 are preferably arranged and dimensioned to receive tabs 208 and 210 of each receiver 202 held within apertures 190, 192 and 194 of socket structure 189a, thus forming part of socket 12. Similarly, square-shaped plate 282 preferably engages socket structure 189B and preferably has slots 283 formed therethrough, wherein slots 283 are preferably arranged and dimensioned to receive tabs 208 and 210 of each receiver 202 held within apertures 196, 198 and 200 of socket structure 189B, thus forming part of socket 14. Each of plates 280 and 282 is preferably retained in place by screw 284 in threaded engagement with corresponding throughholes 286 formed in socket structures 189A and 189B of section 180 of male member 22 (see FIG. 10). Plates 280 and 282 preferably function to provide rigidity to tabs 208 and 210 of receivers 202 so as to ensure proper penetration of the insulation about the respective conductor 40 to be electrically engaged. Additionally, plates 280 and 282 preferably serve as retention means to preclude tabs 208 and 210 from bending or becoming skewed during engagement of male member 22 with female member 20 and to preclude disengagement of receivers 202 from their respective apertures 190, 192, 194, 196, 198 and 200.

Referring now to FIGS. 12, 13 and 14, illustrated therein is cover 24 (see also FIG. 1), wherein cover 24 is preferably generally rectangular-shaped and preferably possesses a centrally formed aperture 290 formed therethrough for penetrably receiving sockets 12 and 14 of socket assembly 16 of male member 22. During attachment of device 10 to a wall stud (see FIG. 3), the wall stud may be twisted or warped to preclude the exterior planar surface of socket assembly 16 from being parallel with the surface of the wallboard to be attached to the stud. To accommodate for such skewed positioning of device 10 and to provide an aesthetically and visually pleasing presentation, cover 24 can be affixed or attached to male member 22 in a skewed relationship therewith to permit conformity with the planar surface of the wallboard. Specifically, studs 292 preferably extend from undersurface 24B of cover 24, wherein each of studs 292 preferably possess a plurality of deformable bells 294. Upon attachment of cover 24 to front side 220D of cover element 220 of male member 22, studs 292 are preferably forced into corresponding throughholes 296 formed in cover element 220 of male member 22 (see FIGS. 3 and 9). Throughholes 296 of cover element 220 preferably have a spider-shaped head or other configuration of ridged or flexible flanges to cooperate with bells 294 of studs 292 of cover 24 so as to ensure engagement and positionable rigidity irrespective of the depth to which studs 292 are forced into throughholes 296. Such an engagement permits cover 24 to be skewed relative to the major plane defined by male member 22, and further permits cover 24 to be flush with the surface of the wallboard. Preferably, bevels 298 encircling aperture 290 of cover 24 function to hide any planar misalignment of cover 24 with socket assembly 16 when cover 24 is attached to male member 22. Similarly, the perimeter of cover 24 may be beveled to accommodate any configuration dictated primarily by aesthetic considerations.

Referring now to FIGS. 15, 16, 17 and 18, each receiver 202 (see also FIG. 9) will be described in detail with reference thereto. Although device 10 is preferably formed entirely from non-electrically conductive material, each receiver 202 is preferably formed from an electrically conductive material so as to permit electrical conductivity therewith. Each receiver 202 preferably includes a pair of preferably curved rectangular-shaped resilient arms 300 and 302 in facing relationship to one another to permit the gripping therein of one of blade prongs 304 or cylindrical prong 306 of a conventional electrical plug 308. Another preferably curved rectangular-shaped resilient arm 310, orthogonally related to arms 300 and 302, preferably includes a pair of opposed keys 312 and 314 formed thereon, wherein keys 312 and 314 are preferably dimensioned to slidably engage slots 204 and 206 of a corresponding one of apertures 190, 192 and 194 of socket structure 189A and apertures 196, 198 and 200 of socket assembly 189B (see FIG. 10). As described above, tabs 208 and 210 preferably possess slots 212 and 214 and are preferably in communication with resilient arms 300, 302 and 310. Slots 212 and 214 of tabs 208 and 210, respectively, must preferably be sufficiently deep to engage a corresponding conductor 40 (see FIG. 6), and of appropriate width to penetrate the insulation of each conductor 40 to make electrical contact therewith. As previously described, to enhance such penetration of the insulation of conductors 40 and to create an electrical engagement therewith, edges 208A and 212A of tab 208 and slot 212, respectively, and edges 210A and 214A of tab 210 and slot 214, are preferably beveled to a more or less sharp edge (see FIG. 18). Alternatively, if the material of tabs 208 and 210 is sufficiently thin, a beveled or sharpened edge may not be necessary.

Figure 15:
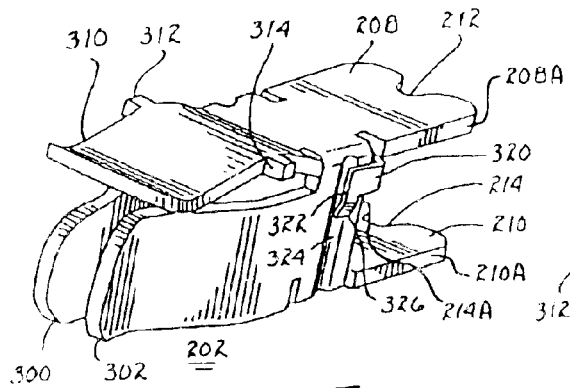
FIG. 15 is a perspective view of a receiver of a dual-purpose wiring device according to a preferred embodiment of the present invention.
Figure 17:
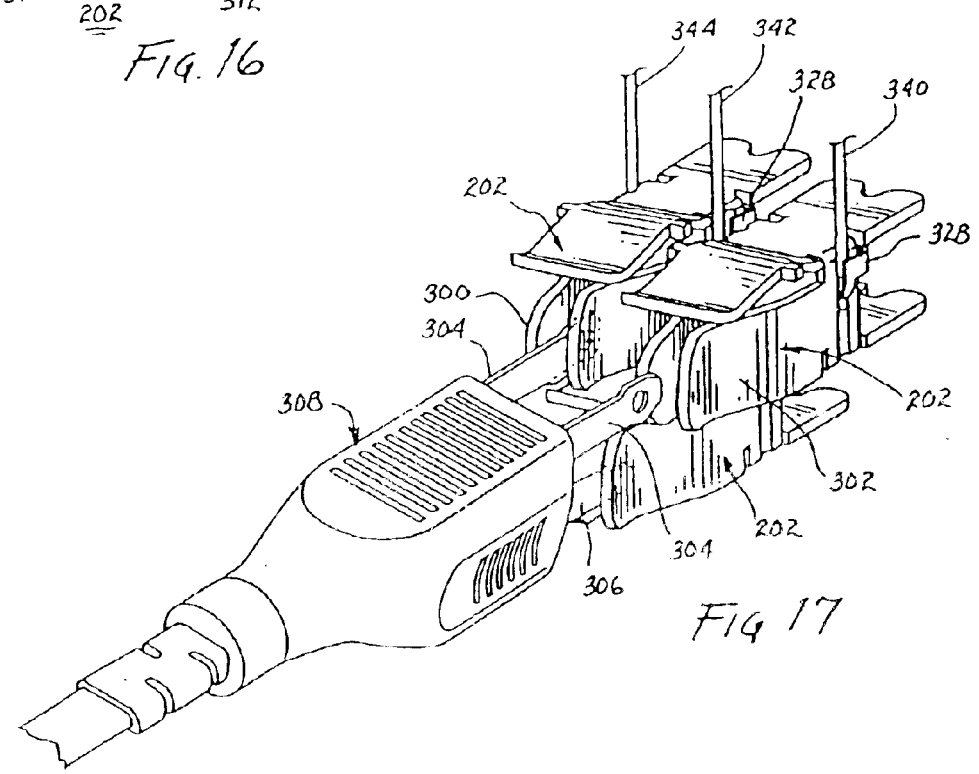
FIG. 17 is a representative view of a conventional grounded electrical plug engaging a set of three receivers mounted within the male member of a dual-purpose wiring device according to a preferred embodiment of the present invention.

To provide an electric power take off from within dual-purpose wiring device 10 without cutting or severing any conductor of cable 30, a resilient clamp 320 may be formed on one or both sides of receiver 202, preferably proximal to tab 208, wherein clamp 320 is preferably a small piece of electrically conductive material and preferably possesses arm 322 formed thereon. A groove or depression 324 is preferably formed on receiver 202, preferably behind arm 322 of clamp 320 and in general alignment therewith. To make an electrical connection with receiver 202, the uninsulated end of an electrical conductor is placed within depression 324 and under arm 322. As arm 322 is downwardly biased and resilient, it will tend to grip the conductor, retaining it securely therein. To enhance retention of the conductor, end 326 of arm 322 is preferably downwardly bent, as best depicted in FIG. 15. An additional clamp 328 may be disposed on receiver 202, opposite clamp 320, so as to permit attachment of two independent conductors to each receiver 202. As best illustrated in FIG. 17, each of receivers 202 includes a clamp 328 for engaging the terminal ends of respective ones of conductors 340, 342 and 344.

Figure 18:
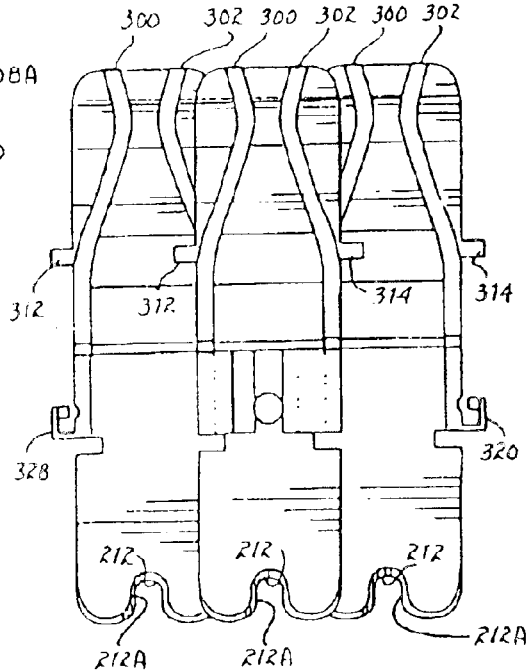
FIG. 18 is a top view of the receivers of a dual-purpose wiring device according to a preferred embodiment of the present invention.
Figure 16:
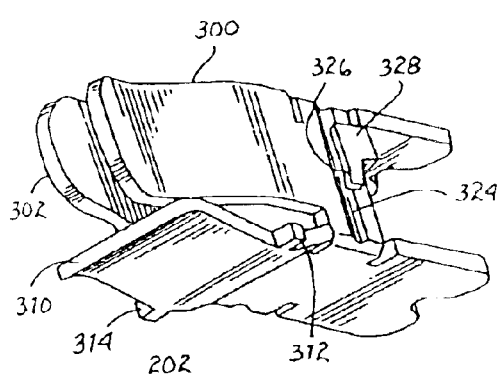
FIG. 16 is a perspective view of a receiver of a dual-purpose wiring device according to a preferred embodiment of the present invention.

Referring now to FIG. 18, illustrated therein is the relative positions of three receivers 202 forming the electrical interconnections between the three conductors 40 of cable 30, wherein a plug 308 can be plugged into one of the associated sockets 12 or 14.

Figure 19:
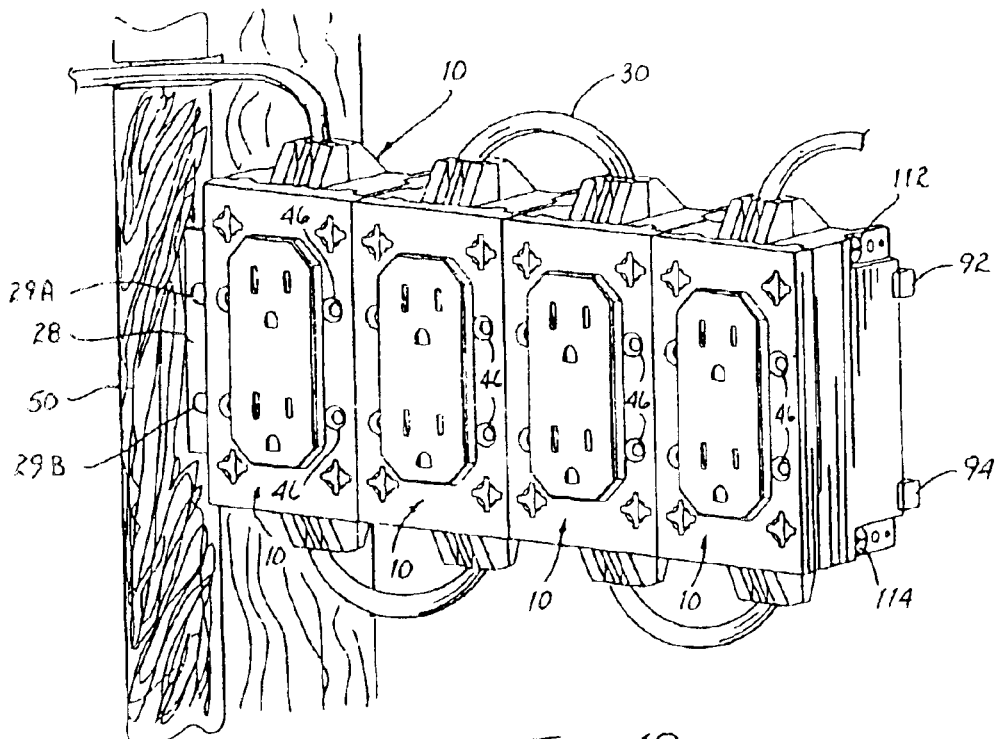
FIG. 19 is a perspective view of a plurality of adjacently attached dual-purpose wiring devices according to a preferred embodiment of the present invention.
Figure 20:
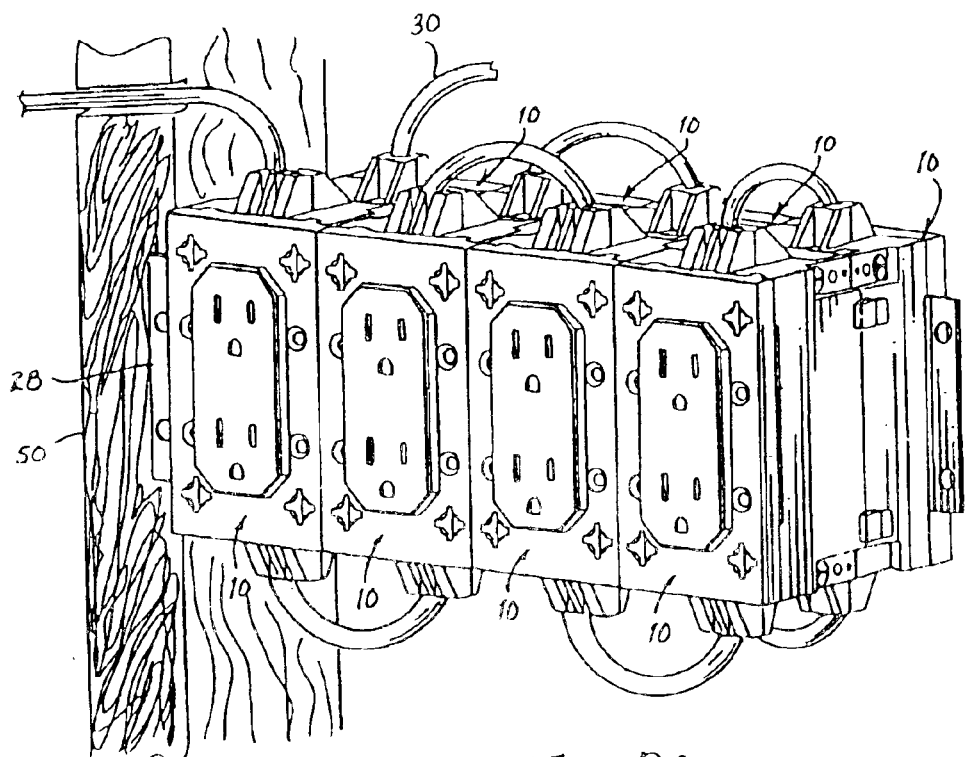
FIG. 20 is a perspective view of a plurality of adjacently and rearly attached dual-purpose wiring devices according to a preferred embodiment of the present invention.

Referring now to FIG. 19, illustrated therein is device 10, attached to a stud 50 via flange 28 via screws, nails, or the like penetrating throughholes 29a and 29b of flange 28 and thereafter into threaded engagement with stud 50. Several additional dual-purpose wiring devices 10 are serially ganged to the stud supported dual-purpose wiring device 10 through engagement of snap studs 94 of one dual-purpose wiring device 10 with slots 82 of the adjacent dual-purpose wiring device 10 and by flange 28 of one device 10 being inserted into an adjacent device 10 and retained in place by bolts or screws extending through throughholes 46 formed on cover 24, through throughholes 29A and 29B of the inserted flange 28 of the adjacent device 10, and thereafter into threaded engagement with the underlying posts 150 and 152. Additionally, bolts may extend through two or more dual-purpose wiring devices 10 by penetrable engagement with respective throughholes 112 and 114 of female members 20. A single uncut length of cable 30 is serially located in each of the dual-purpose wiring devices 10, thus defining the serpentine path illustrated in FIG. 19. Where two or more socket assemblies 16 are intended to protrude on opposing sides of a wall, two sets of gang dual-purpose wiring devices 10 may be secured back-to-back as illustrated in FIG. 20, wherein a single uncut cable 30 preferably also extends serially through each of the dual-purpose wiring devices 10.

Figure 21:
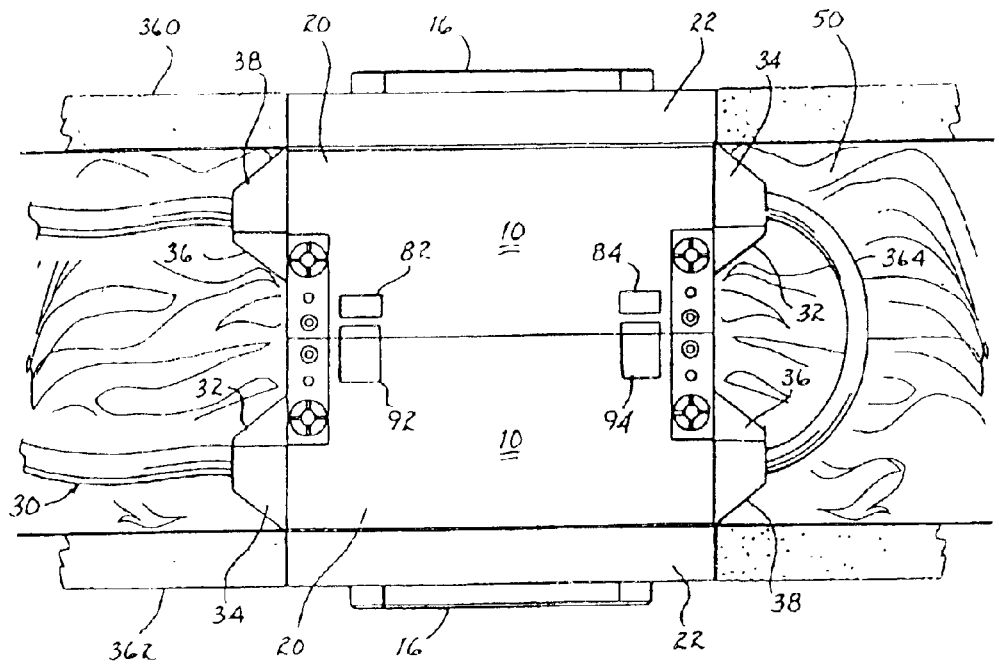
FIG. 21 is a side view of a pair of dual-purpose wiring devices according to a preferred embodiment of the present invention, showing the devices attached back-to-back and an uncut electrical cable extending serially therethrough.

When an electrical outlet is desired on opposing sides of a wall, the configuration illustrated in FIG. 21 may be employed. A dual-purpose wiring devices 10 is preferably secured to stud 50 via flange 28, as described above. Another dual-purpose wiring device 10 is attached to the anchored dual-purpose wiring device 10 by engagement of tubes 68 and 72 of one female member 20 with first set of tubes 62 and second set of tubes 64, respectively, of the other female member 20. Further illustrated in FIG. 21, is wallboard 360 on one side of stud 50 and wallboard 362 on the opposing side of stud 50. It may be noted that the thickness of male member 22 extending from respective female member 20 is essentially equivalent to the thickness of wallboard 360 or 362. Socket assembly 16 extending from each male member 22 extends beyond the plane of the outer surface of corresponding wallboard 360 or 362. Cover 24 (not shown) preferably extends beyond the area of male member 22 and preferably serves to hide from view the junction between each male member 22 and the inner wall of the aperture formed in wallboard 360 or 362 to accommodate device 10. Cable 30 serially extends through each of dual-purpose wiring devices 10 and may define a loop 364 from one dual-purpose wiring device 10 to the other. The remaining ends of cable 30 may be connected to a source of electrical power and/or a further dual-purpose wiring device 10 or an electrical fixture of choice.

Figure 22:
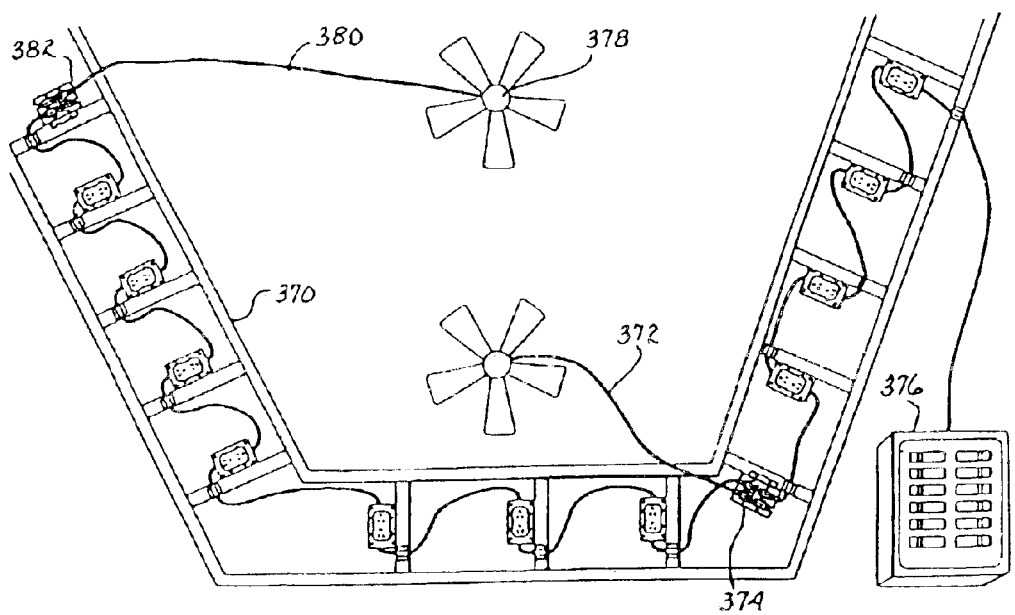
FIG. 22 is a top view of a plurality of dual-purpose wiring devices according to a preferred embodiment of the present invention, showing the devices mounted to studs of a wall and interconnected through a common uncut cable.

Referring now to FIG. 22, illustrated therein is a plurality of dual-purpose wiring devices 10 supported by corresponding studs in an extended wall 370. FIG. 22 further illustrates extension of a cable 372 from a dual-purpose wiring device 374, wherein cable 372 is attached to receivers 202 within device 374 via engagement therein to clamps 320 and/or 328 of the respective receivers 202. A switch box 376 may be employed to control or regulate the power provided to all or some of the devices 10 illustrated. FIG. 22 further illustrates an electric ceiling fan 378 receiving electric power through cable 380 extending from electric outlet box 382.

Figure 23:
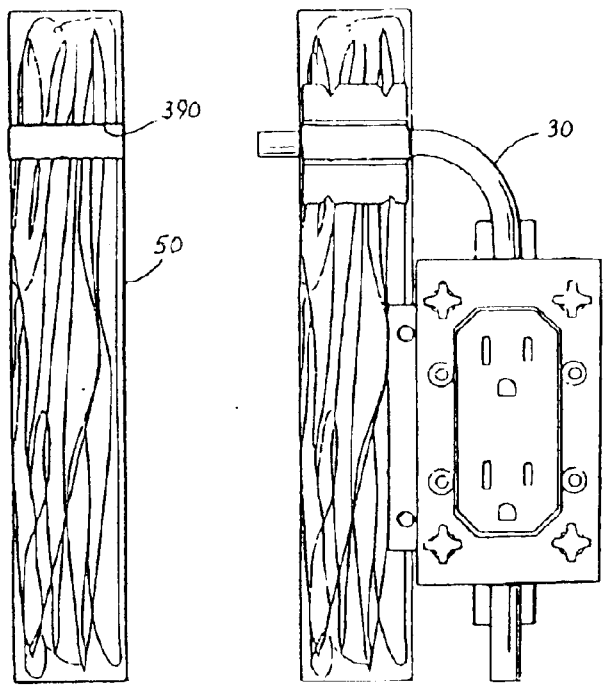
FIG. 23 is a front view of a dual-purpose wiring devices according to a preferred embodiment of the present invention, showing the device attached to a stud of a wall with a cable extending therefrom and securely nested within slots formed in each stud.
Figure 25:
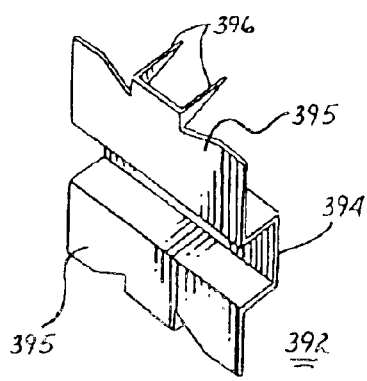
FIG. 25 is a side perspective view of a retainer of the type shown in FIG. 24 according to a preferred embodiment of the present invention.
Figure 24:
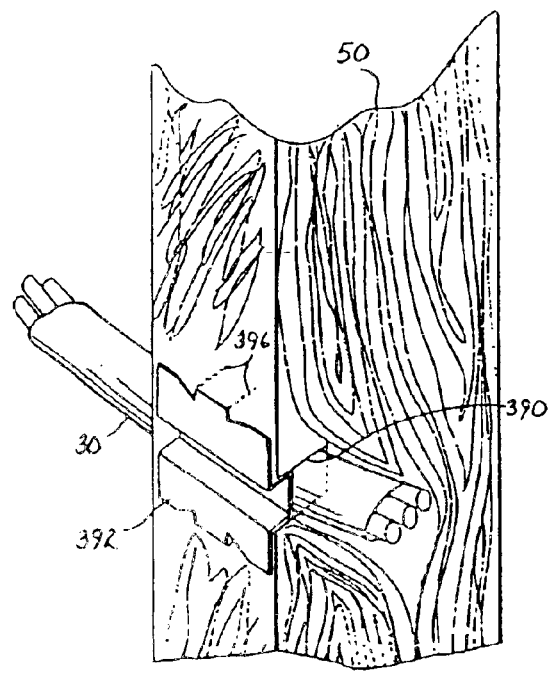
FIG. 24 is a side perspective view of a slot in a stud for retaining a cable therein and a preferred retainer attached thereto to secure the cable in place.

Conventional practice in wiring a dwelling or other facility involves boring holes through the wall studs and threading an electrical cable therethrough. The threading of such cable, particularly for an extended wall length, is laborious and somewhat difficult due to kinking and coiling of the cable. These problems can be eliminated by forming a slot 390 in a wall stud 50, as illustrated FIGS. 23 and 24, wherein cable 30 is depicted positioned within slot 390. Such a configuration avoids the necessity of threading an end of a potentially lengthy cable through a plurality of holes in corresponding wall studs. Cable 30 is preferably retained within slot 390 of stud 50 by retainer 392, as best illustrated in FIGS. 23, 24 and 25. Retainer 392 is preferably hat-shaped, having inverted U-shaped portion 394 and flanges 395 formed thereon, wherein portion 394 preferably has a width substantially equal to that of slot 390 formed in stud 50. The depth of portion 394 is preferably less than the depth of slot 390 formed in stud 50, so as to permit cable 30 to lie therein and abut portion 394, as best illustrated in FIG. 24. After cable 30 is laid in slot 390, portion 394 of retainer 392 is inserted into slot 390 and thereafter preferably hammered in place, wherein such hammering will preferably drive pointed prongs 396 formed on flanges 395 into stud 50 to retain retainer 392 in place. It may be noted that retainer 392 may be formed from a single sheet of metallic material or other suitable material.

Figure 26:
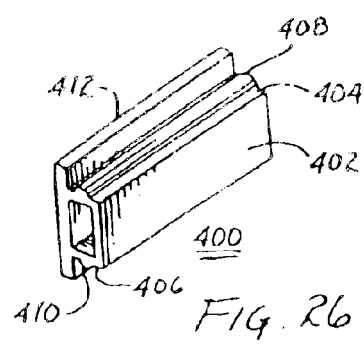
FIG. 26 is a side perspective view of a retainer according to an alternate embodiment of the present invention.

FIG. 26 preferably illustrates an alternate retainer 400, also substantially hat-shaped, having rectangular-shaped element 402 with a height substantially equal to that of slot 390. To ensure frictional engagement of retainer 400 with slot 390, opposing sides 404 and 406 of element 402 possess raised ridges 408 and 410 for compressive engagement with the sides of slot 390. A rectangular-shaped cover plate 412 attached to element 402 is utilized to bear against stud 50; however, cover plate 412 is not mandatory. It may be noted that retainer 400 is also retained permanently in place by the wallboard that covers stud 50.

It is contemplated in an alternate embodiment that device 10 could be manufactured to possess any number of sockets.

It is contemplated in an alternate embodiment that device 10 could be manufactured from any non-electrically conductive material, wherein receivers 202 are preferably manufactured from any electrically conductive material.

It is contemplated in an alternate embodiment that device 10 could be attached to a plurality of devices 10 via any attaching means known within the art.

It is contemplated in an alternate embodiment that device 10 could be manufactured to retain and electrically engage any number of conductors 40.

Although device 10 is herein described in its preferred form in use with presently defined conventional wire, non-conventional wire such as pre-spread wire or any other type of available wiring may be utilized. It is also contemplated in alternate embodiments that the present invention could be utilized in DC systems.

It is contemplated in an alternate embodiment that device 10 could be manufactured to possess safety switches and/or safety-trip mechanisms.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

I claim:

1. A dual-purpose wiring device for use with cable having at least one conductor, said dual-purpose wiring device comprising in combination:
   a. at least one female member comprising:
      i. means for receiving and aligning at least one conductor of the cable; and
      ii. means for mounting said dual-purpose wiring device to a structure; and
   b. at least one male member comprising:
      i. at least one set of conductive receivers arranged so as to define an electrical socket, each of said receivers having a first end and a second end wherein said first end makes electrical contact with the at least one conductor and wherein said second end makes electrical contact with the prongs of an electrical plug; and
      ii. means for attaching said male member to said female member.

2. The dual-purpose wiring device as set forth in claim 1 further comprising an adjustable cover carried by said male member.

3. The dual-purpose wiring device as set forth in claim 1 further comprising means for mounting a plurality of dual-purpose wiring devices adjacently.

4. The dual-purpose wiring device as set forth in claim 1 further comprising means for mounting a plurality of dual-purpose wiring devices back-to-back.

5. The dual-purpose wiring device as set forth in claim 1, wherein said device is utilized with insulated cable and wherein said first end of said receiver is incisive to penetrate the insulative covering of the cable thus facilitating electrical engagement.

6. A dual-purpose wiring device for electrically connecting at least one electrical wire having a first end and a second end, and a continuous midsection to an electrical socket adapted to receive at least one prong of an electrical plug, said dual-purpose wiring device comprising:
   a. means for removably retaining the prong of the electrical plug;
   b. means to electrically contact at least one portion of the continuous midsection of said electrical wire; and
   c. means to conduct energy from the electrical wire to the at least one prong of the electrical plug removably retained in said dual-purpose wiring device.

7. The dual-purpose wiring device as set forth in claim 6, wherein said means for removably retaining the at least one prong of the electrical plug is at least one conductive receiver having a first end and a second end, wherein a plurality of gripping members are carried by said first end, said plurality of gripping members defining a prong receptacle at one end of said conductive receiver.

8. The dual-purpose wiring device as set forth in claim 7, wherein said means for electrically contacting the electrical wire is at least one incisive member, said at least one incisive member carried by said second end of said electrical receiver, wherein said at least one incisive member penetrates the insulation of the electrical wire to facilitate electrical engagement.

9. The dual-purpose wiring device as set forth in claim 6 further comprising:
   a. a plurality of receivers for removably retaining a plurality of prongs of the electrical plug and for electrically contacting a plurality of wires, wherein said electrical receiver electrically contacts at least one portion of each continuous midsection of each wire of the plurality of wires and conducts energy from the plurality of wires to the plurality of prongs of the electrical plug removably retained in said electrical receiver.

10. An electrical receiver for contacting at least one insulated electrical wire and receiving at least one prong of an electrical plug, said electrical receiver comprising:
   a. a plurality of resilient arms dimensioned and positioned to grip there between the prong of the electrical plug, said resilient arms positioned proximal to a first end of said electrical receiver;
   b. means for penetrating the insulation of the electrical wire and electrically communicating with the electrical wire, said means positioned proximal to a second end of said electrical receiver; and
   c. means for electrically communicating with an additional auxiliary electrical wire, wherein said means for electrical communication is an electrically conductive resilient member carried by said electrical receiver.

11. A dual-purpose wiring device for use with at least one electrical cable, comprising in combination:
   a. at least one female casing having at least one first pair of protruding members for gripping and supporting the electrical cable therebetween; and
   b. at least one male casing having at least one second pair of protruding members for gripping and supporting the electrical cable therebetween said first pair of protruding members and said second pair of protruding members.

12. A dual-purpose wiring device comprising at least one electrical receiver for contacting at least one electrical wire and receiving at least one prong of a electrical plug, said electrical receiver comprising:
   a. a plurality of resilient arms dimensioned and positioned to grip therebetween the prong of the electrical plug, said resilient arms positioned proximal to a first end of said electrical receiver; and
   b. means for contacting the electrical wire and securing electrical engagement therewith, said means positioned proximal to a second end of said electrical receiver.

13. The electrical receiver as set forth in claim 12, wherein said means for contacting the electrical wire and securing electrical engagement therewith is a generally flat, bi-lobal electrically-conductive member having a generally sharp edge.

14. The electrical receiver as set forth in claim 12 further comprising means for electrical engagement of an auxiliary electrical wire.

15. The electrical receiver as set forth in claim 14, wherein said means for electrical engagement of an auxiliary electrical wire is an electrically-conductive resilient member having a generally sharp edge, said electrically-conductive resilient member carried proximal to said second end of said electrical receiver.

16. The electrical receiver as set forth in claim 12, further comprising a plurality of said electrical receivers, wherein said plurality of electrical receivers forms an electrical connection between a plurality of prongs of the electrical plug and a plurality of electrical wires.

17. A dual-purpose wiring device having an exposed first surface, said exposed first surface is adapted to receive a cover plate adjustably and removably securable thereto via a variable positioning means, said variable positioning means adapted to selectively permit said cover plate to be seated flush against an uneven surface, wherein said variable positioning means is at least one deformable bell formed on the underside of said cover plate, said at least one deformable bell receivable by at least one aperture formed on said exposed first surface, and wherein said at least one deformable bell is capable of providing said cover plate with positionable rigidity.

18. A routing method for threading electrical wires in a dwelling, said routing method comprising the steps of:
   a. forming a slot cut into the side of a wall stud to accept the electrical wire;
   b. placing the electrical wire in said slot;
   c. placing a retaining means dimensioned to be received by said slot, wherein said retaining means retains the electrical wire within said slot, and wherein said retaining means is of rigid material to restore structural strength to the wall stud reduced by said formed slot, said retaining means further comprising at least one pointed prong for penetrably engaging the wall stud.

19. A dual-purpose wiring device for use with an electrical plug having prongs, comprising in combination:
   a. at least one female casing for routing at least one conductor of an electrical cable;
   b. at least one male casing for carrying at least one set of electrical receivers having a first end that electrically engages said conductor and a second end that removably retains the prongs of the electrical plug thereby allowing electrical current to pass from said conductor to said electrical plug; and
   c. means for routing auxiliary wiring through at least two apertures in said dual-purpose wiring device into retention and electrical contact with said set of electrical receivers for the purpose of passing electrical current to an auxiliary location.

20. A dual-purpose wiring device, comprising in combination:
   a. at least one female casing for routing at least one conductor of an electrical cable;
   b. at least one male casing for carrying at least one set of electrical receivers having a first end that electrically engages said conductor and a second end that removably retains the prongs of the electrical plug thereby allowing electrical current to pass from said conductor to said electrical plug; and
   c. means for attaching said at least one male casing with at least one female casing wherein said means first secures said male casing to said female casing for convenience and alignment and then, through threaded engagement draws said male casing to said female casing leveraging the electrical connection between said electrical receivers and said conductor.

21. A method of transferring electrical current from at least one insulated electrical wire to at least one electrical plug, comprising the steps of:

a. placing at least one electrical wire in contact with a first member;

b. contacting the insulation of the electrical wire with a first end of at least one electrical receiver, wherein said first end has an incisive edge and wherein said at least one electrical receiver is positioned between said first member and a second member; and c. pressing said second member and said first member together thereby causing said first end of said at least one electrical receiver to sever the insulation of the electrical wire and make electrical contact therewith.

* * * * *